United States Patent
Hui

(10) Patent No.: US 7,046,307 B1
(45) Date of Patent: May 16, 2006

(54) VIDEO SIGNAL NOISE LEVEL ESTIMATOR

(75) Inventor: Yau Wai Lucas Hui, Singapore (SG)

(73) Assignee: STMicroelectronics Asia Pacific Pte Ltd., Singapore (SG)

(*) Notice: Subject to any disclaimer, the term of this patent is extended or adjusted under 35 U.S.C. 154(b) by 0 days.

(21) Appl. No.: 10/129,910

(22) PCT Filed: Nov. 11, 1999

(86) PCT No.: PCT/SG99/00124

§ 371 (c)(1),
(2), (4) Date: Oct. 29, 2002

(87) PCT Pub. No.: WO01/35677

PCT Pub. Date: May 17, 2001

(51) Int. Cl.
*H04N 5/14* (2006.01)

(52) U.S. Cl. .................. 348/700; 348/607; 375/240.29
(58) Field of Classification Search ............... 348/700, 348/607, 678; 358/463; 382/170, 274, 275; 375/240.29
See application file for complete search history.

(56) References Cited

U.S. PATENT DOCUMENTS

| | | | | |
|---|---|---|---|---|
| 5,018,215 A | * | 5/1991 | Nasr et al. .................. 382/155 |
| 5,257,121 A | * | 10/1993 | Steinberg .................... 358/447 |
| 5,610,729 A | | 3/1997 | Nakajima .................... 358/463 |
| 6,052,484 A | * | 4/2000 | Kobayashi .................. 382/195 |

FOREIGN PATENT DOCUMENTS

DE 43 41 760 A1 6/1995

* cited by examiner

*Primary Examiner*—Victor R. Kostak
(74) *Attorney, Agent, or Firm*—Lisa K. Jorgenson; E. Russell Tarleton; Seed IP Law Group PLLC

(57) ABSTRACT

A method and apparatus for noise level estimation in a digital video signal, the apparatus including a pixel activity detector that produces a mean pixel activity level for each picture in the video signal, a contrast analyzer that produces a contrast activity level for each picture and a noise level calculator that is coupled to the activity detector and contrast analyzer to produce an estimated noise level by offsetting the contrast activity level from accumulated output of the activity detector.

19 Claims, 2 Drawing Sheets

VIDEO SIGNAL NOISE LEVEL ESTIMATOR

CROSS-REFERENCE TO RELATED APPLICATION

This application is a National Stage of International Application No. PCT/SG99/00124, filed Nov. 11, 1999, which application is incorporated herein by reference in its entirety.

BACKGROUND OF THE INVENTION

The present invention relates to digital video processing and noise reduction. More particularly, it relates to a method and apparatus for estimating noise level in video signals.

DESCRIPTION OF PRIOR ART

Noise reduction techniques have been applied to television or video signals to improve subjective viewing quality of the signal as well as to improve the compression efficiency in video encoding systems. Such noise reduction techniques usually include the use of various types of low-pass filters, median filters, adaptive spatial filters and temporal recursive filters. Usually the noise level of input video is estimated in order to avoid under filtering of noise video or over filtering of busy video sequences. One example of noise estimation is disclosed in U.S. Pat. No. 5,844,627. This patent describes several ways of computing noise variance signals for the estimation. Basically, the noise variance is computed according to neighbourhood pixel variance of a smooth area in the video image. The smooth image area may be selected by the user or automatically detected.

Another known technique for noise level detection is disclosed in the article "Memory Integrated Noise Reduction IC for Television" by G. de Haan, et al., IEEE Transactions on Consumer Electronics, May 1996, Volume 42, Number 2. In this article, the minimum absolute difference between two groups of neighbouring pixels on different positions in the same image field is used to estimate the noise level. This is done assuming that a threshold exists between local noise estimates of plain areas and other areas in the image.

The techniques which require user interaction to define areas such as smooth or plain areas within the video sequence images are not really suitable for most consumer applications and real time operations. Furthermore, algorithms for automatic detection of such areas are usually difficult to implement due to the normally large dynamic range of video input source materials. Accordingly, most existing methods of noise level estimation are video content dependent because they assume that at least some part of the video image is a smooth or plain area. This assumption is not always correct because a smooth or plain area is not always present in each video field. Accordingly, the sensitivity of such known noise level estimators is effected by video content and the results of the estimation are sometimes unreliable.

DISCLOSURE OF THE INVENTION

An object of the present invention is to provide a more robust method and apparatus for noise level estimation in digital video signals.

Generally speaking, the present invention recognises that within a picture the difference between a pixel value and its neighbour pixel value mean may be due to noise and/or actual image detail. The intensity of such image detail affects the contrast or sharpness of the picture. On the other hand, it is possible to determine a value indicative of the contrast or sharpness of the picture. Therefore, the noise level of a picture can be estimated by removing this contrast indicative value from the average of the pixel difference.

More specifically, the invention provides a method of noise level estimation in a digital video signal including the steps of:
  determining, for each picture, mean pixel activity and contrast activity; and
  obtaining a noise level estimation signal by offsetting the contrast activity from the mean pixel activity, and wherein
  the mean pixel activity is determined by taking the sum of all pixel activity values in a picture divided by the number of pixels in the picture, and the contrast activity is determined by assigning a value to contrast activity in accordance with the contrast in the picture.

The invention also provides apparatus for noise level estimation in a digital video signal, said apparatus including:
  a mean pixel activity detector means (102,103) for receiving a digital video signal and producing a mean pixel activity level for each picture in the video signal;
  a contrast analyser (106) coupled to receive signals derived from the activity detector (102) and operable to produce a contrast activity level for each picture in the video signal; and
  a noise level calculator (104) coupled to receive signals derived from the activity detector and said contrast activity level,
  said noise level calculator being operable to offset the contrast activity level from the signals derived from the activity detector to generate output signals representative of noise levels in said video signal.

DETAILED DESCRIPTION OF THE PREFERRED EMBODIMENTS

Figure 1:
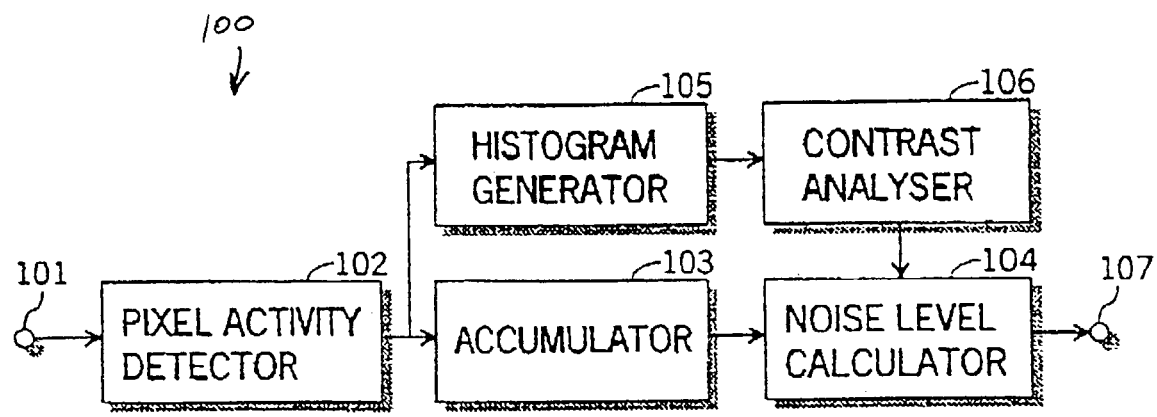
FIG. 1 is a block diagram of a system for estimating noise level in video signals.

FIG. 1 shows in block diagram form a system 100 for digital video processing and noise reduction. The major components of the system include a pixel activity detector 102, an accumulator 103, a noise level calculator 104, a histogram generator 105 and a contrast analyzer 106. Typically, a digitized video signal is coupled to an input terminal 101. The video signal is applied to the input of the pixel activity detector 102, which calculates for each pixel in the input video signal a pixel activity value. In the preferred embodiment of the invention, the pixel activity value is calculated as the absolute difference between the current pixel value and the mean value of its neighboring pixels, i.e. pixel activity=abs [pixel−(pixel left+pixel right)/3]. In the preferred embodiment, the neighboring pixels are the two adjacent pixels in the line one, either side of the pixel in question. It would, of course, be possible to alternatively or additionally include pixels above and below the pixel in question or pixels which are two or three pixels distant to the left or right. Techniques for selection of suitable neighboring pixels are well known in the art.

Alternatively, a high pass filter with an absolute value output may be used as a pixel activity detector. Many types of suitable high pass filters are known in the art and one of these may be selected for use, the final selection largely being a question of quality, accuracy and cost. A very simple example of a suitable high pass filter has the following coefficients [−0.25, 0.5, and −0.25].

Output from the detector 102 is coupled to the input of the accumulator 103, which operates to sum all of the pixel activity values of a picture. Output from the detector 102 is also inputted to the histogram generator 105, which generates a histogram of the calculated pixel activity value. The accumulator 103 is arranged to produce the mean pixel activity by summing all pixel activities from the detector 102 for the picture and dividing by the total number of pixels in the picture. It may be possible to simplify implementation of the circuit by reducing the size of the histogram table produced by the generator 105, for example by scaling down or truncating pixel activity values. Scaling down pixel activity value can simply be accomplished by deeming that the new pixel activity value equals the pixel activity value divided by two. Truncating pixel activity values can be accomplished by the following logical step:

if (pixel activity value<32) new pixel activity value pixel activity value; else new pixel activity value=31

Figure 3:
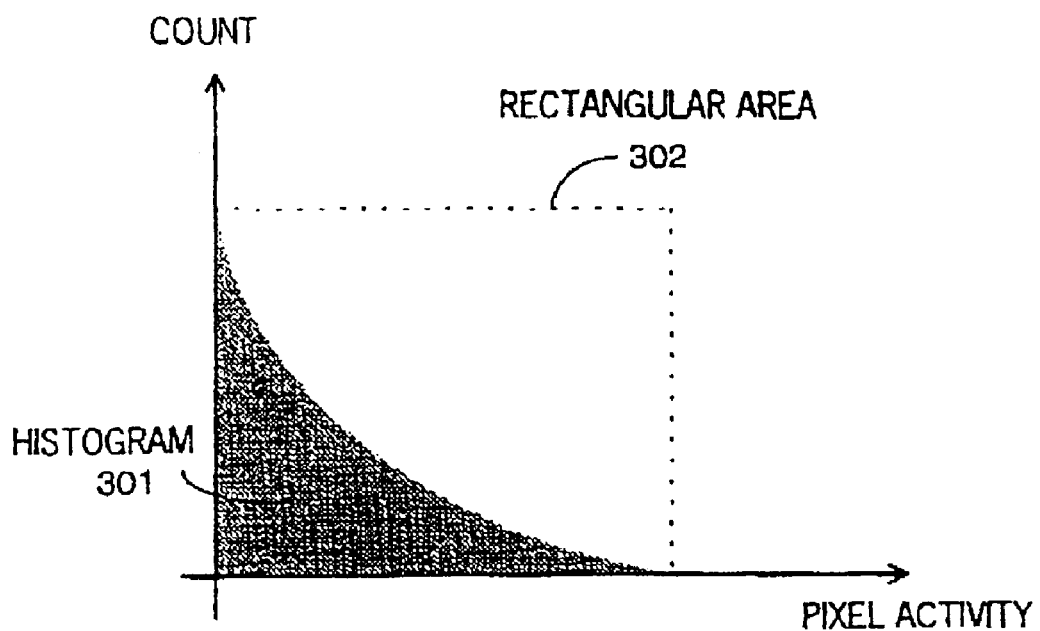
FIG. 3 is a histogram of pixel activity.
Figure 4:
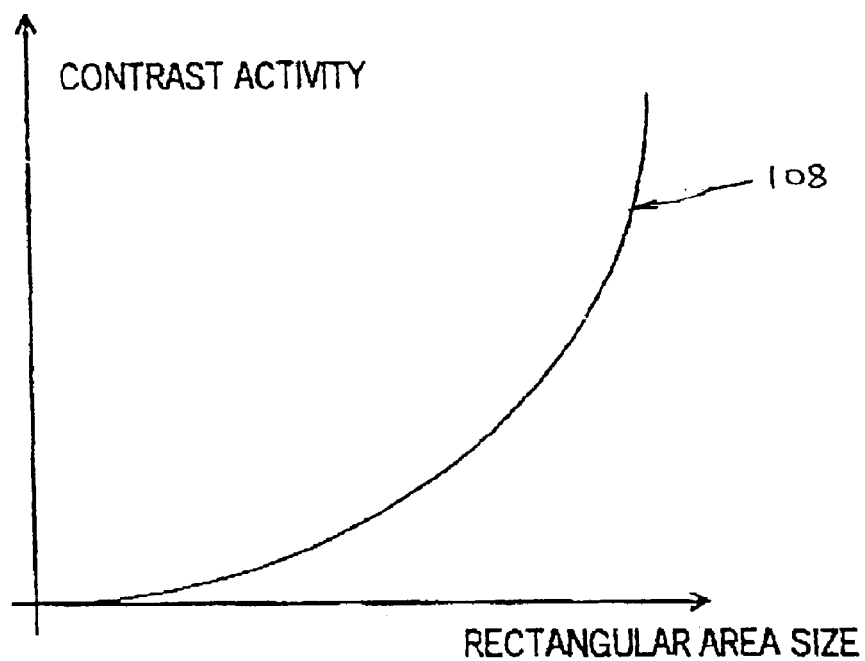
FIG. 4 shows graphically parameters used to estimate contrast activity.

Output from the histogram generator 105 is coupled to the input of the contrast analyzer 106. At the end of a picture, the contrast analyzer 106 examines the generated histogram and from that it estimates a contrast activity value. Typically, it is possible to estimate how sharp or blurry a picture is by looking at the shape of the histogram. In accordance with the invention, a method of estimating the contrast activity by reference to two parameters as follows. The first parameter is a maximum rectangular area size containing the histogram. The second parameter is obtained from a look-up table that estimates contrast activity. This method is diagrammatically illustrated in FIG. 3 where the histogram 301 is shown with the horizontal axis being pixel activity and the vertical axis being the count of pixels. The maximum rectangular area 302 is drawn from the points where the histogram meets the horizontal and vertical axes, as shown. FIG. 4 shows a look-up table in graphical form with the horizontal axis being rectangular area size and the vertical axis being contrast activity. The look-up table determines the contrast activity as a function of the rectangular area size. The curve 108 in the look-up table can be determined by experiments for translating the rectangular size to a contrast activity value for the picture. The look-up table can be determined by experiments in which various images with known or desired output noise levels are subjected to the system to generate corresponding histogram rectangular sizes and average pixel activity values, and from these collection of values a graph such as FIG. 4 can be generated. Accordingly, persons skilled in the art will be able to generate appropriate look-up tables. Other methods such as linear interpolation or spline estimation may also be used instead of the look-up table. These techniques are also well known in the art and generally relate to the field of estimation of a curve or transfer function.

From the accumulated pixel activity, an average pixel activity for the picture is calculated using the noise level calculator 104, which receives input from the accumulator 103 and the contrast analyzer 106. Basically, the noise level calculator 104 offsets or subtracts the accumulated pixel activity values by the contrast activity from the contrast analyzer 106. Output from the noise level accumulator 104 is coupled to an output terminal 107, the signals representing the estimated output noise level as required. It is possible to limit the output noise levels so as to reside within predetermined minimum and maximum values according to requirements so as to make subsequent digital processing efficacious.

Figure 2:
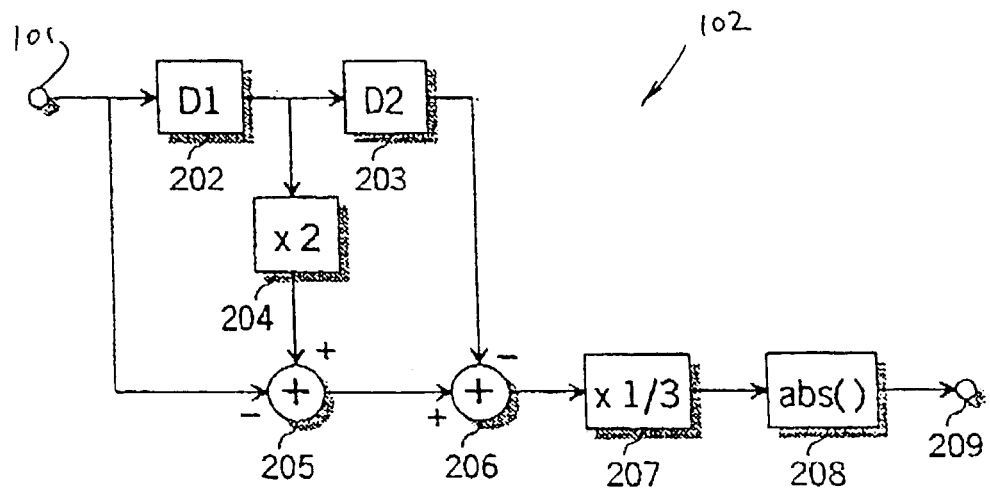
FIG. 2 is a more detailed block diagram of part of the system shown in FIG. 1.

FIG. 2 illustrates in more detail an example of the pixel activity detector 102. Successive pixels of each line of video data are inputted at the terminal 101. The circuit calculates a difference between a pixel and the mean value of the pixels at its left and right. The circuit of FIG. 2 includes first and second delay elements 202 and 203, first and second adders 205 and 206, and first and second multipliers 204 and 207. Output from the second multiplier is coupled to an absolute value circuit 208, the output of which is coupled to the output terminal 209, which is the input to the histogram generator 105 and the accumulator 103. The circuit components are operable to determine the difference between a pixel and the mean value of the pixel and its neighboring left and right pixels because of the action of the delay elements 202 and 203, which have delays equal to a typical period of a pixel. Other arrangements could be implemented for obtaining differences between the pixel and mean values of other adjacent pixels. The absolute value of the difference constitutes the output pixel activity value appearing at the output terminal 209.

It is possible to implement the accumulator 103, noise level calculator 104, histogram generator 105 and contrast analyzer 106 using techniques that are well known in the art. It is therefore not necessary to describe these components in detail.

It will be appreciated by those skilled in the art that the present invention provides an adaptive and robust method and system for noise level estimation in digital video signals. The hardware implementation is comparatively simple and inexpensive. The present invention can be beneficially used as an input in video noise reduction systems such as an input to determination the degree of filtering to be used. This improves the subjective quality of the video presentation. The noise level estimation can also be applied to digital video signals as a pre-processing step prior to video compression with the result that on decompression of the video signals an improved video display can be obtained.

Many modifications will be apparent to those skilled in the art without departing from the spirit and scope of the invention. All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of noise level estimation in a digital video signal, comprising the steps of:
   determining, for each pixel, a pixel activity value representing the relative activity level of the pixel as compared to neighboring pixels;
   determining, for each picture, mean pixel activity by taking the sum of all pixel activity values in a picture divided by the number of pixels in the picture, and contrast activity by assigning a value to contrast activity based on the contrast in the picture and the pixel activity values; and obtaining a noise level estimation signal by offsetting the contrast activity from the mean pixel activity.

2. The method of claim 1 wherein each pixel activity value is determined by taking the absolute value of the differences between a pixel and the mean of the pixel and the pixels that are adjacent thereto in the same line of the video signal.

3. The method of claim 2 wherein the step of obtaining a noise level estimation signal is obtained by subtracting the contrast activity from the mean pixel activity.

4. The method of claim 2 wherein the contrast activity is determined by the steps of generating a histogram of pixel activity values, and analyzing the shape of the histogram to determine contrast activity.

5. The method of claim 4, wherein the step of analyzing the shape of the histogram includes the steps of identifying points where there are zero and maximum pixel activities, utilizing said points to define a rectangular area size parameter, and determining contrast activity by reference to said area size parameter.

6. The method of claim 5 wherein values of contrast activity are determined empirically and stored in a look-up table as a function of area size parameter and, for each picture, said area size parameter is determined and inputted to the look-up table to thereby determine the contrast activity for the picture.

7. An apparatus for noise level estimation in a digital video signal, the apparatus comprising:

a mean pixel activity detector means for receiving a digital video signal and producing a pixel activity value, representing the relative activity level of the pixel as compared to neighboring pixels for each pixel of each picture in the video signal and a mean pixel activity level for each picture in the video signal;

a contrast analyzer coupled to receive the pixel activity values derived from the activity detector means and operable to produce a contrast activity level for each picture in the video signal; and a noise level calculator coupled to receive signals derived from the activity detector means and said contrast activity level, said noise level calculator operable to offset the contrast activity level from the signals derived from the activity detector means to generate output signals representative of noise levels in said video signal.

8. The apparatus of claim 7 wherein the mean pixel activity detector means comprises a pixel activity detector and an accumulator, and wherein the pixel activity detector is operable to generate a pixel activity level by taking the absolute value of the difference between a pixel and the mean value of that pixel and selected neighboring pixels.

9. The apparatus of claim 8 wherein the pixel activity detector is operable to generate the pixel activity level by taking the absolute value of the difference between each pixel and the mean value of that pixel and its left and right neighboring pixels in the same line of the picture.

10. The apparatus of claim 8 wherein the accumulator is operable to generate said mean pixel activity level by summing all pixel activity values for a picture and dividing by the total number of pixels in the picture.

11. The apparatus of claim 10 wherein the noise level calculator is operable to subtract the contrast activity level from the signals derived from the activity detector.

12. The apparatus of claim 10, comprising a histogram generator coupled between the pixel activity detector and the contrast analyzer, the histogram generator operable to generate a histogram of pixel activity valves and wherein the contrast analyzer analyzes the shape of the histogram to determine said contrast activity level.

13. The apparatus of claim 12 wherein the contrast analyzer is operable to identify points where there are zero and maximum pixel activities and to assign contrast activity levels by reference to said zero and maximum pixel activities.

14. The apparatus of claim 13 wherein the contrast analyzer is operable to define an area size parameter that is derived from said zero and maximum pixel activities, and the contrast activity levels are assigned by reference to a look-up table defining the relationship between values of area size parameters and contrast activity levels.

15. An apparatus for noise level estimation in a digital video signal, the apparatus comprising:

a mean pixel activity detector that receives the digital video signal and generates a pixel activity value, representing the relative activity level of the pixel as compared to neighboring pixels, for each pixel of each picture in the video signal and a mean pixel activity level signal for each picture in the digital video signal by taking the sum of all pixel activity values in the picture divided by the number of pixels in the picture;

a contrast analyzer coupled to receive the pixel activity values from the mean pixel activity detector and to produce a contrast activity level signal for each picture in the digital video signal by assigning a value to contrast activity in accordance with a contrast in the picture in the digital video signal;

a noise level calculator coupled to receive the contrast activity level signal and the mean pixel activity level signal and to offset the contrast activity level signal from the mean pixel activity level signal to generate output signals that are representative of noise level in the digital video signal.

16. An apparatus for noise level estimation in a digital video signal, the apparatus comprising:

a mean pixel activity detector that receives the digital video signal and generates a mean pixel activity level signal for each picture in the digital video signal by taking the sum of all pixel activities in the picture divided by the number of pixels in the picture, the mean pixel activity detector comprising a pixel activity detector and an accumulator, the pixel activity detector configured to generate a pixel activity level signal by taking the absolute value of the difference between a pixel and the mean value of the pixel and selected neighboring pixels;

a contrast analyzer coupled to receive the pixel activity level signal from the mean pixel activity detector and to produce a contrast activity level signal for each picture in the digital video signal by assigning a value to contrast activity in accordance with a contrast in the picture in the digital video signal;

a noise level calculator coupled to receive the contrast activity level signal and the mean pixel activity level signal and to offset the contrast activity level signal from the mean pixel activity level signal to generate output signals that are representative of noise level in the digital video signal.

17. An apparatus for noise level estimation in a digital video signal, the apparatus comprising:

a mean pixel activity detector that receives the digital video signal and generates a mean pixel activity level signal for each picture in the digital video signal by taking the sum of all pixel activities in the picture divided by the number of pixels in the picture, the mean pixel activity detector comprising a pixel activity detector and an accumulator, the pixel activity detector configured to generate a pixel activity level signal by taking the absolute value of the difference between a pixel and the mean value of the pixel and selected neighboring pixels, the accumulator configured to generate the mean pixel activity signal by summing all pixel activity level signals for a picture and dividing by the total number of pixels in the picture in the digital video signal;

a contrast analyzer coupled to receive the pixel activity level signal from the mean pixel activity detector and to produce a contrast activity level signal for each picture in the digital video signal by assigning a value to contrast activity in accordance with a contrast in the picture in the digital video signal;

a noise level calculator coupled to receive the contrast activity level signal from the contrast analyzer and the mean pixel activity level signal and to offset the contrast activity level signal from the mean pixel activity level signal to generate output signals that are representative of noise level in the digital video signal.

18. An apparatus for noise level estimation in a digital video signal, the apparatus comprising:

a mean pixel activity detector that receives the digital video signal and generates a mean pixel activity level signal for each picture in the digital video signal by taking the sum of all pixel activity values in the picture divided by the number of pixels in the picture;

a contrast analyzer coupled to receive the pixel activity values from the mean pixel activity detector and to produce a contrast activity level signal for each picture in the digital video signal by assigning a value to contrast activity in accordance with a contrast in the picture in the digital video signal;

a noise level calculator coupled to receive the contrast activity level signal from the contrast analyzer and the mean pixel activity level signal from the mean pixel activity detector and to offset the contrast activity level signal from the mean pixel activity level signal to generate output signals that are representative of noise level in the digital video signal, the noise level calculator further operable to subtract the contrast activity level signal from the mean pixel activity level signal derived from the mean pixel activity detector.

19. An apparatus for noise level estimation in a digital video signal, the apparatus comprising:

a mean pixel activity detector that receives the digital video signal and generates a mean pixel activity level signal for each picture in the digital video signal by taking the sum of all pixel activity values in the picture divided by the number of pixels in the picture;

a contrast analyzer coupled to receive the pixel activity values from the mean pixel activity detector and to produce a contrast activity level signal for each picture in the digital video signal by assigning a value to contrast activity in accordance with a contrast in the picture in the digital video signal;

a noise level calculator coupled to receive the contrast activity level signal from the contrast analyzer and the mean pixel activity level signal from the mean pixel activity detector and to offset the contrast activity level signal from the mean pixel activity level signal to generate output signals that are representative of noise level in the digital video signal; and a histogram generator coupled between the mean pixel activity detector and the contrast analyzer, the histogram generator configured to generate a histogram of pixel activity values, and the contrast analyzer configured to analyze the shape of the histogram to determine the contrast activity level.

* * * * *